United States Patent [19]
Togashi et al.

[11] 4,272,162
[45] Jun. 9, 1981

[54] GUEST-HOST LIQUID CRYSTAL DISPLAY DEVICE

[75] Inventors: Seigo Togashi; Takaharu Suzuki; Takaaki Aoyama, all of Tokorozawa, Japan

[73] Assignee: Citizen Watch Co., Ltd., Tokyo, Japan

[21] Appl. No.: 95,048

[22] Filed: Nov. 16, 1979

[30] Foreign Application Priority Data

Nov. 21, 1978 [JP] Japan .................. 53-143754
Nov. 21, 1978 [JP] Japan .................. 53-143755

[51] Int. Cl.³ .................................................. G02F 1/137
[52] U.S. Cl. .................................... 350/349; 350/341; 350/347 R
[58] Field of Search .................. 350/349, 341, 347 R

[56] References Cited
U.S. PATENT DOCUMENTS

| | | | |
|---|---|---|---|
| 3,833,287 | 9/1974 | Taylor et al. | 350/349 |
| 4,084,884 | 4/1978 | Raynes | 350/334 |
| 4,097,128 | 6/1978 | Matsumoto et al. | 350/335 |

OTHER PUBLICATIONS

Cole et al. "Dependence of Absorption and Optical Contrast of a Dichroic Dye Guest on the Pitch of a Chiral Nematic Host", *Applied Physics Letters*, vol. 31, pp. 58-59, Jul. 15, 1977.

Primary Examiner—Edward S. Bauer
Attorney, Agent, or Firm—Jordan and Hamburg

[57] ABSTRACT

A guest-host liquid crystal display device which employs a pleochroic liquid crystal mixture having helical molecular ordering. To prevent the occurrence of a light-scattering turbid texture the helical molecular ordering is converted into a miss-matching state of an increased strain energy by a proper combination of surface alignment treatments applied to the facing surfaces of a pair of transparent plates that sandwich the liquid crystal layer.

4 Claims, 13 Drawing Figures

$d/p_o = 0$ $d/p_o = 1$

GUEST-HOST LIQUID CRYSTAL DISPLAY DEVICE

BACKGROUND OF THE INVENTION

This invention relates to a guest-host liquid crystal display device, particularly one of the White & Taylor type.

A guest-host liquid crystal display device which is known in the art employs a pleochroic liquid crystal mixture obtained by dissolving a pleochroic material as a guest in a nematic liquid crystal serving as a host. In such a device, light transmission can be varied by applying an electric field to control the molecular ordering of the liquid crystal mixture. A typical example of such a device has been disclosed in U.S. Pat. No. 3,551,026 issued to G. H. Heilmeier on Dec. 29, 1970.

A disadvantage encountered in this device is a lower level of display brightness owing to the incorporation of an auxiliary polarizer. An improvement upon this device is the display device which utilizes the White & Taylor-type guest-host effect as disclosed in U.S. Pat. No. 3,833,287 issued on Sept. 3, 1974.

In the White & Taylor device a chiral material is added to a pleochroic liquid crystal mixture to impart to the mixture a helical molecular structure in which the helical pitch can be varied freely depending upon the amount of chiral material added. The chiral material may be a cholesteric liquid crystal, a chiral-nematic liquid crystal, or a non-liquid crystal chiral material, etc. While this device affords a high contrast since it allows the auxiliary polarizer to be dispensed with, a serious defect is that the number of turns $d/P_o$ must be made greater than 1, where d is the thickness of the liquid crystal layer and $P_o$ is the inherent helical pitch. This follows from the fact that the inherent helical pitch $P_o$ becomes smaller as the amount of added chiral material is increased to provide the higher contrast. Making $d/P_o$ greater than 1 does not permit the display to return immediately to the transparent colored state upon removal of the driving voltage. Instead, there is a "storage" effect in which selected portions of the display exhibit a turbid state which greatly detracts from the effectiveness of the display.

BRIEF SUMMARY OF THE INVENTION

It is an object of the present invention to prevent the storage effect (focal conic phenomenon) which is the most serious defect encountered in the White & Taylor-type guest-host (WT-type GH) liquid crystal display device.

It is another object of the present invention to provide a liquid crystal display device exhibiting greatly improved contrast.

These objects are realized in the following manner. The adopted display device comprises a pleochroic liquid crystal mixture of a helical molecular structure a thin layer of which is interposed between two transparent plates provided with transparent electrodes. The molecular axis of the liquid crystal is inclined at an angle of between 10 and 80 degrees with respect to the normal of the plates, and the strain energy of the liquid crystal layer is increased by inducing miss-matching between the liquid crystal molecular orientation at the surfaces of the plates, on the one hand, and the thickness of the liquid crystal layer and helical pitch on the other.

DETAILED DESCRIPTION OF THE INVENTION

Figure 1:
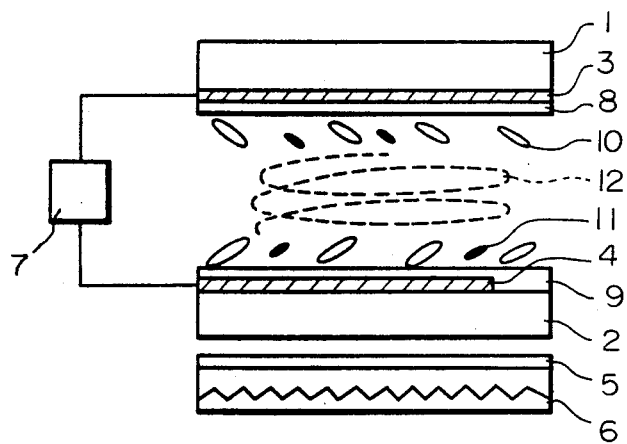
FIG. 1 is a cross-sectional view showing the construction of a display device in accordance with the present invention.

The display device of the present invention as shown in cross-section in FIG. 1 includes transparent plates 1 and 2 serving as substrates, transparent electrodes 3 and 4 formed over the internal surfaces of the plates 1 and 2, respectively, a quarter-wavelength plate 5 positioned below the transparent plate 2 for enhancing the contrast of the display, a reflector 6 attached to a lower surface of the quarter-wavelength plate 5, a driving circuit 7 connected to the transparent electrodes 3 and 4, alignment layers 8 and 9 formed over the surfaces of the transparent plates 1 and 2, respectively, a layer of liquid crystal molecules 10 and a pleochroic material 11. The broken lines designated at 12 illustrate in schematic form the helical molecular ordering of the liquid crystal material. One characterizing feature of the present invention is that the liquid crystal molecules 10 and pleochroic dye molecules 11 are inclined with respect to the surfaces of the plates 1 and 2. In other words, the molecules are imparted with a pretilt angle.

Figure 2:
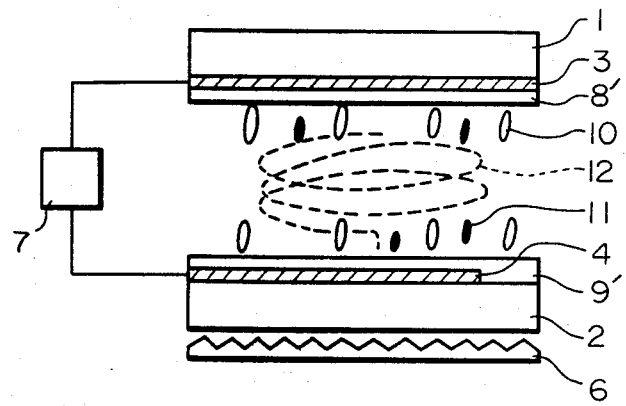
FIGS. 2 and 3 are cross-sectional views showing the construction of a conventional display device, the device of FIG. 2 having been treated for vertical alignment and that of FIG. 3 for horizontal alignment.
Figure 3:
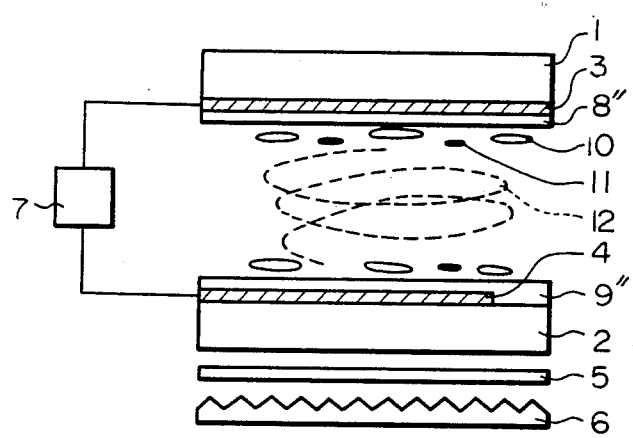

FIGS. 2 and 3 are cross-sectional views showing the constructions of a conventional display device employing the WT-type GH liquid crystal structure. In FIG. 2 vertical surface alignment is adopted, and in FIG. 3 horizontal surface alignment. In FIG. 2 the vertical alignment layers 8' and 9' are obtained by subjecting the plate surfaces to a surfactant such as silane. The display device of this type is not satisfactory since a good display effect cannot be obtained even if a quarter-wave plate is used. In FIG. 3 the horizontal alignment layers 8" and 9" are provided by subjecting the plate surfaces to a rubbing treatment or the like.

Figure 4:
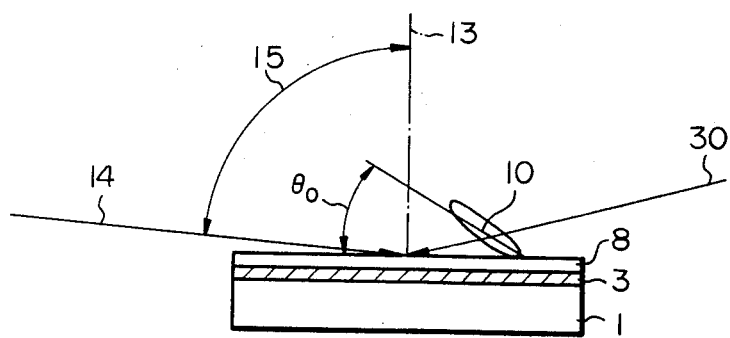
FIG. 4 is a diagram useful in describing slant evaporation applied in an embodiment of the present invention.

A pretilt angle $\theta_o$ of between 10 and 80 degrees as required in the present invention can be obtained by the slant evaporation of a material such as SiO. This slant evaporation treatment can best be understood from FIG. 4 in which the material such as SiO or $MgF_2$ is evaporated onto the surface of the plate 1 from a direction 14 inclined at an angle 15 from the normal to the transparent plate 1. The pretilt angle $\theta_o$ of the liquid crystal molecules 10 depends upon the evaporation velocity v, film thickness t, evaporation angle $\alpha$, and the composition of the evaporated material, but the pretilt angle is chosen freely over a range between 10 and 50 degrees. However, the pretilt angle can be chosen freely between 10 and 80 degrees if the alternating evaporation is carried out between two directions, i.e., between the direction 14 and a direction 30 opposite thereto. In the embodiment of FIG. 4 a pretilt angle of approximately 45 degrees is obtained by evaporating a layer of SiO, wherein $\alpha \simeq 85$ degrees, $v \simeq$ several A/sec., and $t \simeq 500A$.

Figure 5:
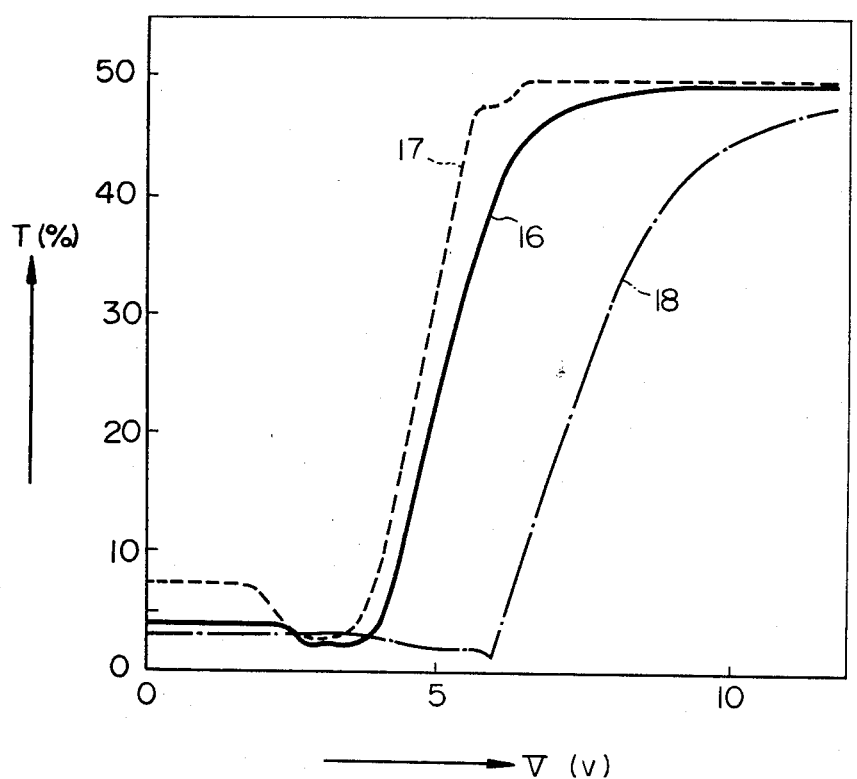
FIG. 5 is a graph showing the relation between transmission and applied driving voltage in the display device of the present invention as compared with that of the prior art.
Figure 6A:
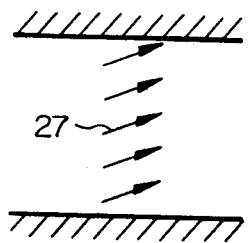
FIGS. 6A, 6B, 6C and 6D show the matching and miss-matching relationship between molecular orientation of the liquid crystal on the one hand and thickness of the liquid crystal layer and helical pitch on the other.
Figure 6B:
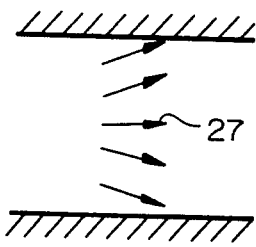
Figure 6C:
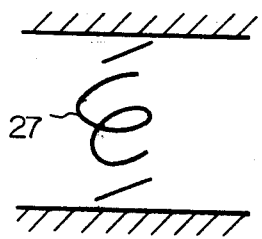
Figure 6D:
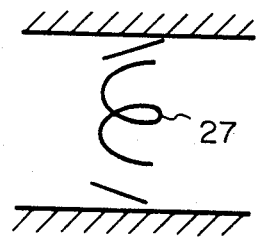

FIG. 5 shows the characteristics for a case in which a pleochroic liquid crystal mixture, having the composition given in Table I, is utilized in the three types of display devices depicted in FIGS. 1 through 3. More specifically, FIG. 5 shows the relation between applied driving voltage and transmission, wherein the curves 16, 17 and 18 represent the characteristics of these three devices, respectively.

TABLE I

| | |
|---|---|
| (1) trans-4-n-propyl-(4-cyanophenyl)-cyclohexane | 32.3% |
| trans-4-n-penthyl-(4-cyanophenyl)-cyclohexane | 32.3% |
| trans-4-n-heptyl-(4-cyanophenyl)-cyclohexane | 19% |
| trans-4-n-penthyl-(4-cyanobiphenyl)-cyclohexane | 11.6% |
| (2) Cholesteryl nonanoate | 4.3% |
| (3) [chemical structure: N—⟨⟩—N=N—⟨⟩—N=N—⟨⟩—N=N—⟨⟩—N] | 0.5% |

If the contrast C is defined as being equal to $T_{ON}/T_{OFF}$, where $T_{OFF}$ is the transmission when the applied voltage is 0 volts and $T_{ON}$ the transmission when the applied voltage is 10 volts, C in the case of the invention as presently embodied will be approximately 12, as can be understood from curve 16, whereas C is approximately 8 for the conventional horizontal surface alignment and approximately 7 for the conventional perpendicular alignment, as shown by the respective curves 18 and 17. Thus it is apparent that this embodiment of the present invention is far superior in effect. It should also be noted that the present embodiment makes use of an operating voltage of approximately 6 volts which is not much higher than the approximate 5.5 volts required in the conventional device that relies upon the vertical alignment layer, but which is much lower than the approximate 10 volts utilized in the device having the horizontal alignment layer. It can therefore be understood from the characteristics shown in FIG. 5 that the present invention (whose characteristics are indicated by the solid line 16) has better saturation characteristics of T with respect to V and can be driven at a lower voltage in comparison with the prior art example (characteristics indicated by the dotted curve 18) which adopts the horizontal alignment layer, and also has a smaller value for $T_{OFF}$ for the colored state in comparison with the prior art example (characteristics shown by the broken line 17) which utilizes the vertical alignment layer. The overall effect of the present invention is superior contrast.

The chief advantage of the present invention is the elimination of the storage effect or focal conic texture as will now be described.

In the present invention, elimination of turbid texture which results from the storage effect is achieved by inducing miss-matching between the molecular orientation at the surfaces of the transparent plates and the helical molecular ordering.

Matching and miss-matching conditions can best be understood from the diagrams of FIG. 6. The case for nonhelical (homogeneous) molecular ordering holds when the number of turns $d/P_o$, representing the ratio of liquid crystal film thickness d to the helical pitch $P_o$, is 0. In such a case the orientation immediately in the vicinity of both plate surfaces is such that the liquid crystal molecules 27 have little strain in condition FIG. 6A, whereas there is a large degree of strain across the liquid crystal layer under condition FIG. 6B. The same is true when $d/P_o$ is equal to 1, with there being less strain under condition FIG. 6C than FIG. 6D. The conditions FIG. 6A and FIG. 6C are those for maximum matching, while the conditions for FIG. 6B and FIG. 6D are those for maximum miss-matching. The liquid crystal display device of the prior art employs these matching conditions while that of the present invention is characterized by the miss-matching conditions.

In order to render these conditions into mathematical form, $\Delta\phi$ will be defined as the difference angle between the molecular orientations of the liquid crystal molecules immediately in the vicinity of both plates. The axis of rotation is set parallel to the normal of the substrates, and the rotation system is set to be the same as that of the liquid crystal (a left-handed system, for example, if the liquid crystal mixture consists of a cholesteric nonanoate). If with this axis of rotation and rotation system the liquid crystal molecules at the surface of one plate and having the pretilt angle are rotated through a given angle to orient them substantially coincidentally with the liquid crystal molecules at the other plate, this angle of rotation will be $\Delta\phi$. For example, $\Delta\phi=0$ in FIG. 6A and FIG. 6C, while $\Delta\phi=\pi$ in FIG. 6B and FIG. 6D.

Figure 7:
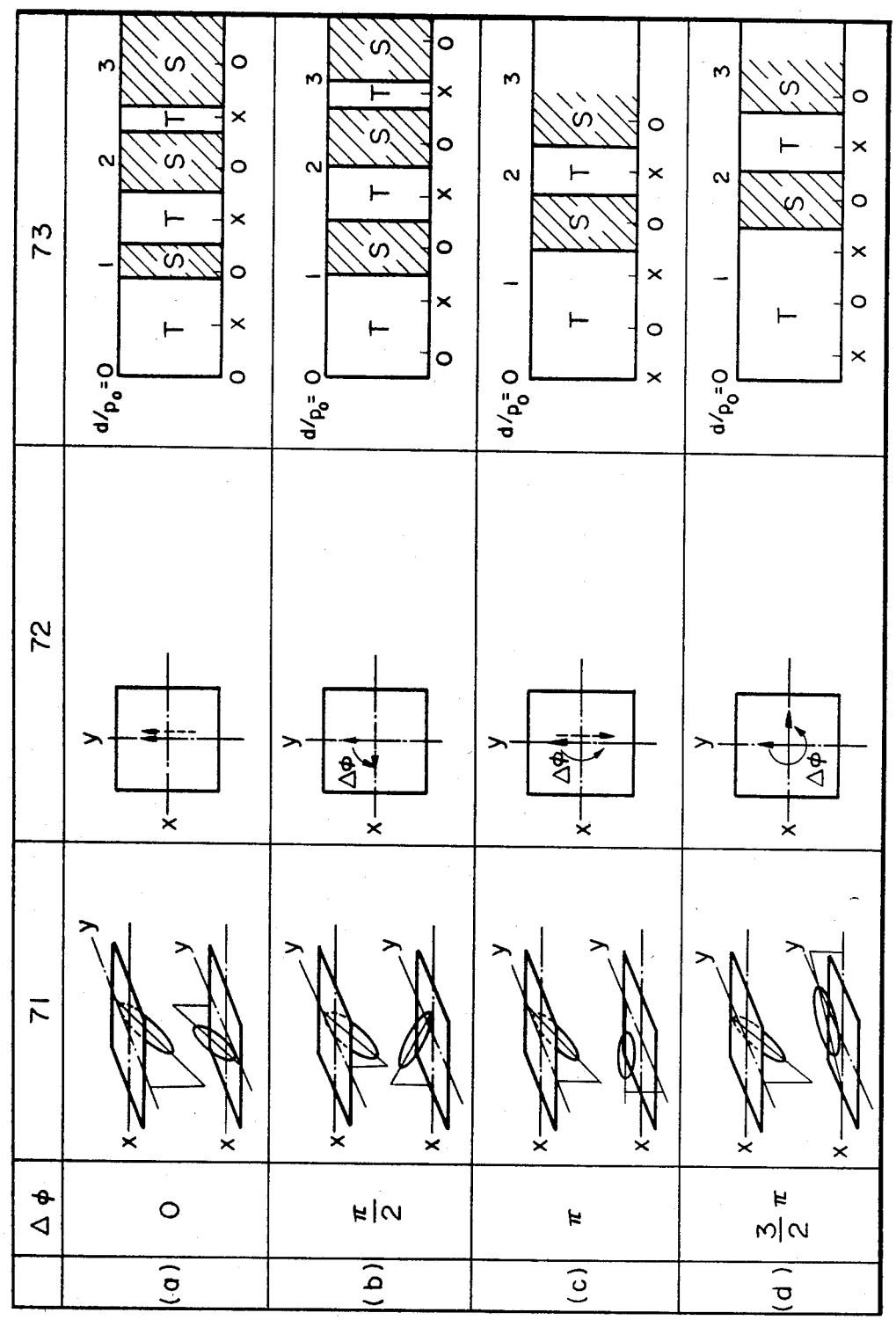
FIG. 7 shows perspective views and front views which illustrate a difference angle $\alpha\phi$, representative of the difference in alignment direction between the liquid crystal molecules adjacent the upper and lower plates, as well as the orientation of the liquid crystal molecules, and further illustrates the ranges over which the turbid state appears as $d/P_o$ is varied.

In FIG. 7 a perspective view 71 is useful in describing the molecular orientation in the immediate vicinity of two plates when $\Delta\phi$ takes on four different values. The corresponding plan views are indicated at 72, in which the solid arrows show orientation at the surface of the upper plate and the broken arrows the orientation at the surface of the lower plate. For a left-handed liquid crystal system, $\Delta\phi = 0$, $\pi/2$, $\pi$, and $3/2\pi$ for the conditions (a), (b), (c) and (d), respectively.

With $\Delta\phi$ as defined above, the maximum miss-matching condition becomes $$\Delta\phi = 2\pi(d/Po - m + \tfrac{1}{2}) \qquad (1)$$

while the maximum matching condition is given by $$\Delta\phi 2\pi(d/Po - m) \qquad (2)$$

where m is the maximum integer which does not exceed d/Po, and d, Po are as defined above.

In FIG. 7, numeral 73 shows the storage effect in a WT-type GH system when d/Po is varied from 0 to 3 under the conditions (a) through (d). More specifically, if a voltage is applied and then removed, a region T undergoes a transition from a transparent colorless state to a transparent colored state, and a region S undergoes a transition from a transparent colorless state to a turbid colored state. The symbols O, X at the bottom of each region correspond to maximum matching expressed by equation (2) and maximum miss-matching expressed by equation (1), respectively. It can be understood from 73 in FIG. 7 that the maximum miss-matching condition appears in the center of each and every region T where $d/Po \geq 1$. Accordingly, if the miss-matching condition expressed by the equation (3) given below is satisfied for the maximum miss-matching condition expressed by the equation (1), there will be a transition from the colorless transparent state to the colored transparent state without the appearance of the turbid state. The equation (3) is given by $$2\pi(d/Po - m + \tfrac{1}{4}) < \Delta\phi < 2\pi(d/Po - m + \tfrac{3}{4}) \qquad (3)$$

where m, d and Po are as defined above.

Eliminating the turbid state or storage phenomenon from the WT-type GH system allows the helical pitch Po and cell thickness d to be decided by the contrast and driving voltage required for the particular display device. With the conventional system the turbid state occurs if the optimum value of d/Po decided in this manner exceeds 1. Such a system often is not practical. On the other hand, the present invention allows a condition which will not induce the turbid state, to be set for any value of d/Po through utilizing the miss-matching condition of equation (3).

Figure 8A:
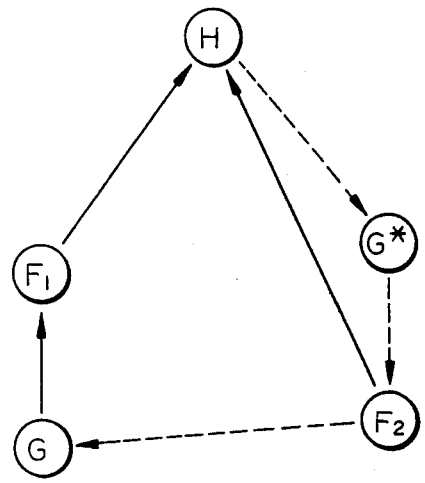
FIGS. 8A and 8B are diagrams illustrating the operating mechanisms employed in the prior art and in the display device of the present invention.
Figure 8B:
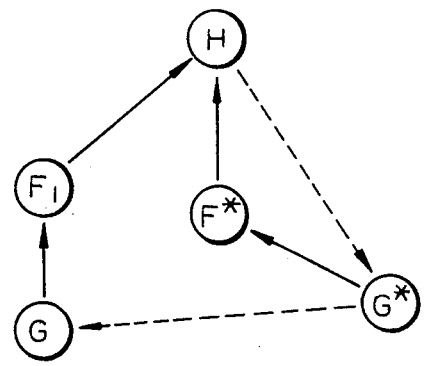
Figure 9:
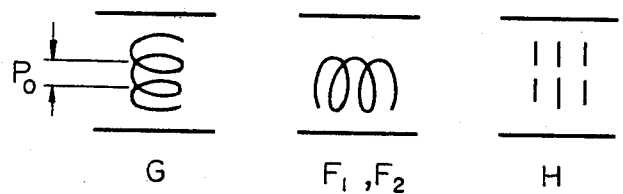
FIG. 9 is a diagram showing molecular arrangement for each of the states depicted in FIGS. 8A and 8B.
Figure 9:
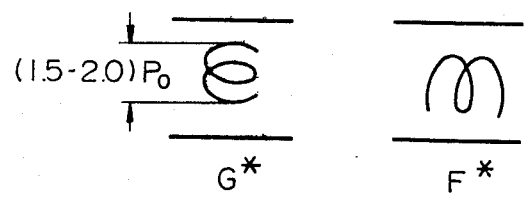

Reference will now be had to FIGS. 8A and 8B, and 9 for a description of the operating mechanism employed in the device of the present invention in comparison with the prior art.

FIG. 8A shows the operating mechanism employed in the display device according to the prior art, while FIG. 8B shows the operating mechanism employed in the present invention. The solid arrows show the transitions in state during the process of applying a voltage, while the broken arrows show transitions in state during the course of removing the voltage. The description will begin with an ON operation (the process of applying a voltage). The operation proceeds as shown in FIG. 8A for a WT-type GH system having the conventional pretilt angle $\theta_0$ of approximately 0 degrees (horizontal alignment) or 90 degrees (vertical alignment), or for a case in which an alignment layer, corresponding to the S states in FIG. 7, is adopted. G represents a stable initial state having a grandjean texture (helical axis perpendicular to the plane of the plates) with a helical pitch Po, as shown at G in FIG. 9. When a voltage is applied there is a transition from the state G to a focal conic texture $F_1$. This texture is turbid and light-scattering, with the helical axis being made parallel to the plates as shown at $F_1$, $F_2$ in FIG. 9. A further increase in voltage from the $F_1$ stage causes the helical structure to unwind so that the liquid crystal molecules become nearly perpendicular to the plates and thus assume a homeotropic texture as depicted at H in FIG. 9.

The ON operation in the case of the present embodiment as shown in FIG. 8B proceeds in approximately the same manner as that of the prior art example of FIG. 8A. Thus, in driving a WT-type GH display device, $F_1$ becomes a transient stage if the applied voltage exceeds a certain value. Hence, a rapid shift is possible from G (colored transparent texture) to H (colorless transparent texture).

The present invention differs from the prior art example in the occurrence or nonoccurrence of the turbid texture at the time of an OFF operation (the process of removing a voltage). In the prior art example shown in FIG. 8A, removing the voltage from the H stage will now give rise to a light-scattering focal conic texture $F_2$ after a temporary traversal through a stage $G^*$. The texture at $G^*$ is a grandjean one in which the helical pitch Po has grown by a factor of 1.5 to 2.0 as schematically shown at $G^*$ in FIG. 9. The fact that this is a grandjean texture is confirmed from the capacitance and the transient response of the birefringence. $F_2$ represents a light-scattering texture which occurs at the time the pitch changes from (1.5 to 2.0) Po to Po. This texture is stably maintained for a period of from several seconds to 20 or 30 minutes before the grandjean texture at G is restored. The appearance of the light-scattered texture at $F_2$ is the most serious disadvantage encountered in the prior art example. This is because the turbid texture at $F_2$ greatly detracts from the display effect.

A feature of the present invention is that the temporarily appearing texture at $G^*$ is rendered relatively stable by means of the surface alignment treatment. In accordance with the present invention, the initial stage G satisfies the miss-matching condition and is relatively unstable while, unlike the prior art, the texture at $G^*$ is rendered highly stable with respect to the texture at G. This is because the texture at $G^*$ has the altered helical pitch and is not subjected to the miss-matching condition applied at G. The result is that the texture at $G^*$ becomes semi-stable rather than fleetingly transient. The texture at $G^*$ in the present embodiment lasts from 10 to 20 seconds to as long as 20 or 30 minutes. Moreover, the transition from $G^*$ to G takes place very slowly owing to the small energy difference between these two states. More specifically, the transition is carried out by moving the boundary located between the $G^*$ region and G region without inviting the light-scattering texture $F_2$ which is encountered in the prior art.

Thus, as described above, it becomes possible to achieve an operating mechanism that switches between the voltage OFF state (colored transparent texture at G or $G^*$) and the voltage ON state (colorless ON state at H) without the turbid texture appearing at all. The present invention is therefore a very distinct improvement over the prior art in which two textures, namely the transparent and turbid textures, appear in the voltage OFF state. In other words, in the prior art switching takes place between a voltage OFF state (which will be the colored transparent texture at G or the colored turbid texture at $F_2$) and a voltage ON state (the colored transparent texture at H).

The embodiment of the present invention has actually been applied to a liquid crystal display device of a wristwatch and it has been found that it can provide a wider viewing angle, a greater quantity of light in the case of a negative-pattern type display, and much better display effects than the twisted nematic-type displays that are now in use. The operating voltage in the present embodiment is 6 volts but this can be lowered by changing the type of liquid crystal composition.

In the present embodiment, the helical pitch Po of the liquid crystal mixture is approximately 5.7 microns, and the thickness d of the liquid crystal layer approximately 10 microns, thereby giving a value of 1.75 for d/Po. While $\Delta\phi$ has been set to $\pi/2$, it is obvious that any value may be chosen as long as it satisfies the condition specified by equation (3). In addition, the selected pretilt angle $\theta_o$ of 45 degrees merely serves as an example; the object of the present invention can be attained for any pretilt angle $\theta_o$ within the range of 10 to 80 degrees. It should also be noted that the same pretilt angle need not be adopted at the surfaces of both plates.

The chiral nematic liquid crystal need not be limited to the left-handed type which is employed in the present embodiment for it is obvious that quite the same effects can be achieved with a right-handed system as well. It is also possible to make use of liquid crystal systems of a structure wherein the central groups are

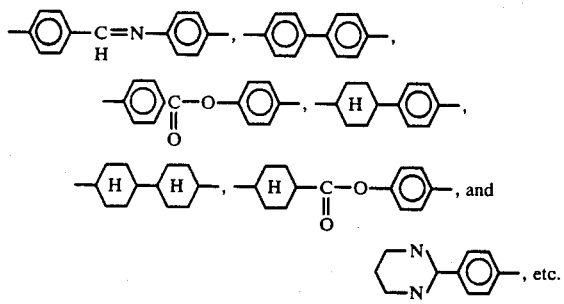

In particular, a liquid crystal system which includes a liquid crystal having

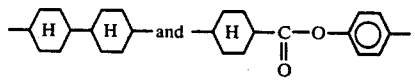

central groups exhibits little optical anistropy and is well suited for use in the WT-type GH effect.

The present invention as described above completely eliminates the occurrence of turbidity which is the most serious defect encountered in liquid crystal display devices that employ the WT-type GH effect. As a result, it is possible for the first time to make practical use of the WT-type GH effect to provide displays that preserve the original outstanding characteristics of this effect. A liquid crystal display device in accordance with the present invention thus promises to be useful not only in calculators, wristwatches, automobile instrumentation and other forms of terminal displays but also in large indoor and outdoor displays owing to the wide viewing angle, high contrast, brightness and similar advantages.

What is claimed is:

1. In a liquid crystal display device having a pair of transparent plates each formed with a transparent electrode and a liquid crystal layer interposed therebetween, in which an electric field is applied to the transparent electrodes to control the transmission of unpolarized light through the liquid crystal layer, the improvement wherein:

said liquid crystal layer comprises a pleochroic liquid crystal mixture composed of a guest pleochroic material and a host liquid crystal material, said liquid crystal layer having helical molecular ordering in the absence of said electric field and homeotropic molecular ordering in the presence of said electric field;

the molecular axis of said pleochroic liquid crystal mixture is inclined at an angle of between 10 and 80 degrees with respect to the normal to said transparent plates; and the orientation of the liquid crystal molecules at the surface of one of said pair of transparent plates crosses the orientation of the liquid crystal molecules at the surface of the other of said pair of transparent plates at an angle $\Delta\phi$ which satisfies the following relation $$2\pi(d/Po - m + \tfrac{1}{4}) < \Delta\phi < 2\pi(d/Po - m + \tfrac{3}{4})$$

where d is the thickness of said liquid crystal layer, Po is the inherent helical pitch of said pleochroic liquid crystal mixture, and m is the maximum integer which does not exceed d/Po.

2. The liquid crystal display device according to claim 1, wherein a quarter-wavelength plate and reflector are disposed at the back of one of said pair of transparent plates.

3. The liquid crystal display device according to claim 1, wherein said pleochroic liquid crystal mixture is composed of a trans-4-n-propyl-(4-cyanophenyl)-cyclohexane, a trans-4-n-penthyl-(4-cyanophenyl)-cyclohexane, a trans-4-n-heptyl-(4-cyanophenyl)-cyclohexane, a trans-4-n-penthyl-(4-cyanobiphenyl)-cyclohexane, a cholesteryl nonanoate, and a material indicated by the following formula

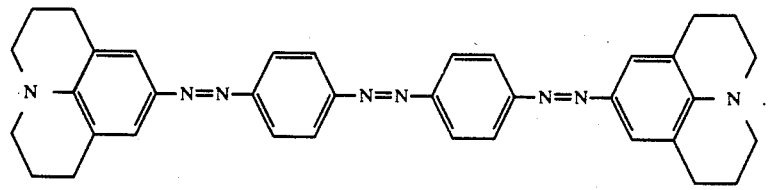

4. The liquid crystal display device according to claim 1, wherein the angle of inclination of said molecular axis is approximately 45 degrees, d/Po is approximately 1.75, and $\Delta\phi$ is approximately $\pi/2$.

* * * * *